US008330378B2

(12) United States Patent
Maehara et al.

(10) Patent No.: US 8,330,378 B2
(45) Date of Patent: Dec. 11, 2012

(54) ILLUMINATION DEVICE AND METHOD FOR CONTROLLING A COLOR TEMPERATURE OF IRRADIATED LIGHT

(75) Inventors: Minoru Maehara, Matsubara (JP); Kazuyoshi Kadotani, Hirakata (JP); Kenichiro Tanaka, Neyagawa (JP); Ichirou Tanimura, Shijounawate (JP); Takuya Nobuta, Ikoma (JP)

(73) Assignee: Panasonic Corporation, Osaka (JP)

( * ) Notice: Subject to any disclaimer, the term of this patent is extended or adjusted under 35 U.S.C. 154(b) by 353 days.

(21) Appl. No.: 12/696,002

(22) Filed: Jan. 28, 2010

(65) Prior Publication Data

US 2010/0225241 A1 Sep. 9, 2010

(30) Foreign Application Priority Data

Jan. 28, 2009 (JP) ................................ 2009-017107
Jan. 28, 2009 (JP) ................................ 2009-017108
Jan. 28, 2009 (JP) ................................ 2009-017109

(51) Int. Cl.
*H05B 37/02* (2006.01)
*H01J 7/24* (2006.01)
*H04N 9/73* (2006.01)

(52) U.S. Cl. ......................... 315/151; 315/112; 348/655

(58) Field of Classification Search .................. 315/379, 315/380, 382.1, 401, 402, 50, 112, 117, 118, 315/291, 149–151, 155–156, 158–159, 307; 348/244, 242, 655, E9.051
See application file for complete search history.

(56) References Cited

U.S. PATENT DOCUMENTS 7,176,640 B2 * 2/2007 Tagawa ......................... 315/308
7,295,180 B2 * 11/2007 Ichikawa et al. .............. 345/102
7,595,784 B2 * 9/2009 Yamamoto et al. ........... 345/102
7,659,880 B2 * 2/2010 Miyazawa .................... 345/102
2008/0002103 A1 * 1/2008 Lee ................................ 349/68

FOREIGN PATENT DOCUMENTS

JP 2008293946 4/2008

* cited by examiner

*Primary Examiner* — Minh D A
(74) *Attorney, Agent, or Firm* — Waddey & Patterson, P.C.; Mark J. Patterson

(57) ABSTRACT

An illumination device is provided for controlling a color temperature of light irradiated from a light source having a plurality of light-emitting elements of different light colors. A control setting module provides a control signal associated with a desired color temperature for the irradiated light. A light quantity determination circuit determines light quantities for each of the light-emitting elements based on a relationship between the control signal from the control setting module and an inverse color temperature. A plurality of driver circuits provide driver signals to the light-emitting elements corresponding to the determined light quantities. In this manner the color temperature for light irradiated from the light source coincides with the desired color temperature.

18 Claims, 14 Drawing Sheets

| CONTROL AMOUNT (deg) | COLOR TEMPERATURE (K) | INVERSE COLOR TEMPERATURE ($MK^{-1}$) | DIFFERENCE OF INVERSE COLOR TEMPERATURE |
|---|---|---|---|
| 7.5 | 2050 | 487.8 | |
| 43.0 | 2300 | 434.8 | 53.0 |
| 79.0 | 2600 | 384.6 | 50.2 |
| 114.0 | 3000 | 333.3 | 51.3 |
| 150.0 | 3500 | 285.7 | 47.6 |
| 186.0 | 4200 | 238.1 | 47.6 |
| 221.0 | 5300 | 188.7 | 49.4 |
| 257.0 | 7200 | 128.9 | 49.8 |
| 292.5 | 11000 | 90.9 | 48.0 |

ILLUMINATION DEVICE AND METHOD FOR CONTROLLING A COLOR TEMPERATURE OF IRRADIATED LIGHT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent applications which are hereby incorporated by reference: Japan Patent Application No. 2009-017107, filed Jan. 28, 2009; Japan Patent Application No. 2009-017108, filed Jan. 28, 2009; and Japan Patent Application No. 2009-017109, filed Jan. 28, 2009.

BACKGROUND OF THE INVENTION

The present invention relates generally to illumination devices for controlling a color temperature of light irradiated from an associated light source. More particularly, the present invention relates to an illumination device capable of varying a light quantity for each of a plurality of light-emitting elements based on a desired color temperature, and a controller for use in accomplishing the same.

Conventionally, there is known a psychological effect (called a Kruithof effect) as follows. Bright pale light (i.e., light of a high color temperature) irradiated from a fluorescent lamp of day-white color provides a pleasant atmosphere, but alternatively a gloomy and chilly feeling may result if the luminance (also referred to as flux density, lumens per unit area, light quantity per unit area, or light intensity) of the lamp is too low. Red light (i.e., light of low color temperature) emitted from an incandescent lamp produces a mild atmosphere if the luminance remains low but produces an unpleasant sensation if the luminance is kept too high (see, e.g. FIG. 8). Various kinds of color temperature variable illumination devices capable of varying the color (or color temperature) from a light source have been developed using this psychological effect.

A color temperature variable light-emitting diode (LED) illumination device is known that includes red LEDs, green LEDs and blue LEDs, and a control circuit (or a controller) for driving the respective LEDs of the illumination device and controlling the light quantity (i.e., luminance) thereof. The controller includes individual control settings provided in a corresponding relationship with the respective colors. The color (or color temperature) of illuminating light (or mixed-color light) can be varied by adjusting each of the control settings and separately adjusting the light quantity of each color (red, green or blue). With such an arrangement, it is not particularly easy for the user to set a desired light color (or a desired color temperature).

It would be possible to simultaneously adjust the quantity of the light of different colors through the manipulation of a single control setting. However, the amount of change in the actual color temperature of the produced light does not necessarily coincide with the amount of change in the light color perceived by the human eye. More specifically, even if the amount of change (e.g., 100 K) in a relatively low color temperature (e.g., 2800 K) is equal to the amount of change in a relatively high color temperature (e.g., 4500 K), the change in the relatively high color temperature is hard to perceive while the change in the relatively low color temperature is easy to perceive.

For that reason, if the amount of change in the control setting is merely proportional to the amount of change in the color temperature, a discrepancy occurs between the change in the color temperature adjusted and the change in the color temperature actually perceived. This makes it difficult to use the light-emitting device.

Furthermore, when the color temperatures are same, a psychological effect varies depending on the luminance (i.e., a light quantity with respect to the area to be illuminated), as shown in FIG. 8. It is very difficult for a user to properly adjust the color (color temperature) and the light quantity and achieve a desired psychological effect.

In many aspects it is desirable to use an illumination device which employs an array of light-emitting diodes as a light source instead of the illumination devices (light fixtures) using an incandescent lamp as a light source. However, the incandescent lamp has a feature that, when a luminance ratio is lowered from 100% in a standard lighting context, a light quantity is reduced and a color temperature is also reduced to adjust the chromaticity of illumination depending on a black body locus, as shown in FIG. 9A and the color space chromaticity diagram in 9B.

However, as mentioned above, a user typically sets the color temperature of the mixed-color light by operating each of the three control settings of the controller and separately adjusting the quantity of the red, green and blue light in a conventional illumination device. It is very difficult for the user to adjust the light quantity and the color temperature of illumination to present a chromaticity adjustment feature similar to that of the incandescent lamp.

BRIEF SUMMARY OF THE INVENTION

An illumination device is provided within the scope of the present invention for facilitating proper adjustment of color temperature and quantity of light, and a controller is further provided for use in the illumination device.

Further, the present invention provides an illumination device capable of adjusting a color and a chromaticity of the illuminating light to approximate certain desirable features of an incandescent lamp.

In an embodiment an illumination device is provided for controlling a color temperature of light irradiated from a light source having a plurality of light-emitting elements of different light colors. A control setting module provides a control signal associated with a desired color temperature for the irradiated light. A light quantity determination circuit determines light quantities for each of the light-emitting elements based on a relationship between the control signal from the control setting module and an inverse color temperature. A plurality of driver circuits provide driver signals to the light-emitting elements corresponding to the determined light quantities. In this manner the color temperature for light irradiated from the light source coincides with the desired color temperature.

In another embodiment, a power supply is provided for driving a light source with a plurality of light-emitting elements to irradiate light having a desired color temperature. A controller input circuit receives an analog signal from a control setting module and generates a DC control signal associated with the desired color temperature. An AC-DC converter converts power from an AC source into DC power. A drive signal converter receives the DC control signal and generates drive signals corresponding to light quantities for each of the light-emitting elements. The light quantities are determined such that in a color temperature range lower than a specified color temperature, the color temperature and an overall light quantity of light irradiated from the light source are increased or decreased together in conjunction with increments in the control signal. The light quantities are further determined such that in a color temperature range equal to or higher than the specified color temperature, the color temperature of light irradiated from the light source is increased or decreased in conjunction with increments in the control signal while the quantity of light irradiated from the light source is kept within a specified range. A plurality of driving circuits are individually configured to drive each of the plurality of light-emitting elements based on an associated drive signal and DC power received from the AC-DC converter.

In another embodiment, a method is provided for controlling a color temperature for light irradiated from a light source having a plurality of light-emitting elements. A first step is receiving a control signal indicative of a desired color temperature for the light irradiated from the light source. A second step includes determining light quantities for each of the plurality of light-emitting elements, with the light quantities determined such that the color temperature of the light irradiated from the light source coincides with the desired color temperature.

When the color temperature is lower than a threshold color temperature, the color temperature and an overall light quantity of light irradiated from the light source are increased or decreased together in conjunction with increments in the control signal. When the color temperature is equal to or higher than the threshold color temperature the color temperature of light irradiated from the light source is increased or decreased in conjunction with increments in the control signal while the quantity of light irradiated from the light source is kept within a specified range.

A third step of the method includes generating pulse width modulated drive signals for each of the light-emitting elements based on the control signals and the determined light quantities for the light-emitting elements. A fourth step includes driving each of the light-emitting elements in accordance with the generated drive signals.

DETAILED DESCRIPTION OF THE INVENTION

Figure 1A:
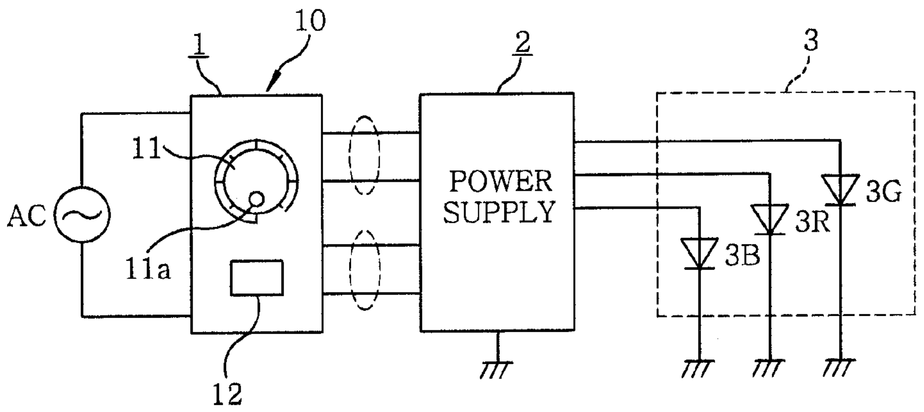
FIG. 1A is a block diagram showing an embodiment of an illumination device of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Referring generally to FIGS. 1-9B, various embodiments are described herein of an illumination device and a controller for adjusting a color temperature and a luminance, or light intensity, generated by the illumination device. Where the various figures may describe embodiments sharing various common elements and features with other embodiments, similar elements and features are given the same reference numerals and redundant description thereof may be omitted below.

Referring now to FIG. 1A, in an embodiment an illumination device as shown includes a light source 3, a controller 1, and a power supply 2. The light source 3 includes light-emitting elements (e.g., light-emitting diodes or LEDs) 3R, 3G and 3B of three different colors, i.e., a red color (R), a green color (G) and a blue color (B). The light-emitting elements 3R, 3G and 3B may be light-emitting elements other than LEDs, such as for example organic electroluminescence (EL) elements.

The chromaticity coordinates (x0, y0) and the luminance Y0 of generated light as mixed-color light are represented by equation 1:

$$x_0 = \frac{x_R\frac{Y_R}{y_R} + x_G\frac{Y_G}{y_G} + x_B\frac{Y_B}{y_B}}{\frac{Y_R}{y_R} + \frac{Y_G}{y_G} + \frac{Y_B}{y_B}} \quad \text{[Eq. 1]}$$

$$y_0 = \frac{Y_R + Y_G + Y_B}{\frac{Y_R}{y_R} + \frac{Y_G}{y_G} + \frac{Y_B}{y_B}}$$

$$Y_0 = Y_R + Y_G + Y_B$$

where $(x_R, y_R)$, $(x_G, y_G)$ and $(x_B, y_B)$ denote the chromaticity coordinates of the light colors of the light-emitting elements 3R, 3G and 3B, respectively, and where $Y_R$, $Y_G$ and $Y_B$ signify the light quantities of the light-emitting elements 3R, 3G and 3B, respectively.

In the light-emitting elements 3R, 3G and 3B, composed in an embodiment of light-emitting diodes, the light colors (the light wavelengths) are not changed even when the light quantities $Y_R$, $Y_G$ and $Y_B$ undergo a collective change in the overall quantity of light. The mixed color of the light can be adjusted by varying the ratio of the light quantities $Y_R$, $Y_G$ and $Y_B$ of the light-emitting elements 3R, 3G and 3B with respect to each other. The overall quantity of illuminating light can be adjusted by varying the light quantities $Y_R$, $Y_G$ and $Y_B$ while keeping the ratio of the light quantities $Y_R$, $Y_G$ and $Y_B$ with respect to each other unchanged. Because the light quantities $Y_R$, $Y_G$ and $Y_B$ of the light-emitting elements 3R, 3G and 3B are determined by the quantity of electric power supplied, the color and quantity of the illuminating light can be adjusted by increasing or decreasing the amount of the electric current supplied from the power supply 2 to the light-emitting elements 3R, 3G and 3B.

The color of the illuminating light can be adjusted to a particular color temperature by determining the light quantities $Y_R$, $Y_G$ and $Y_B$ of the light-emitting elements 3R, 3G and 3B so that the chromaticity of the illuminating light changes substantially along a black body locus as known in the art.

Figure 1B:
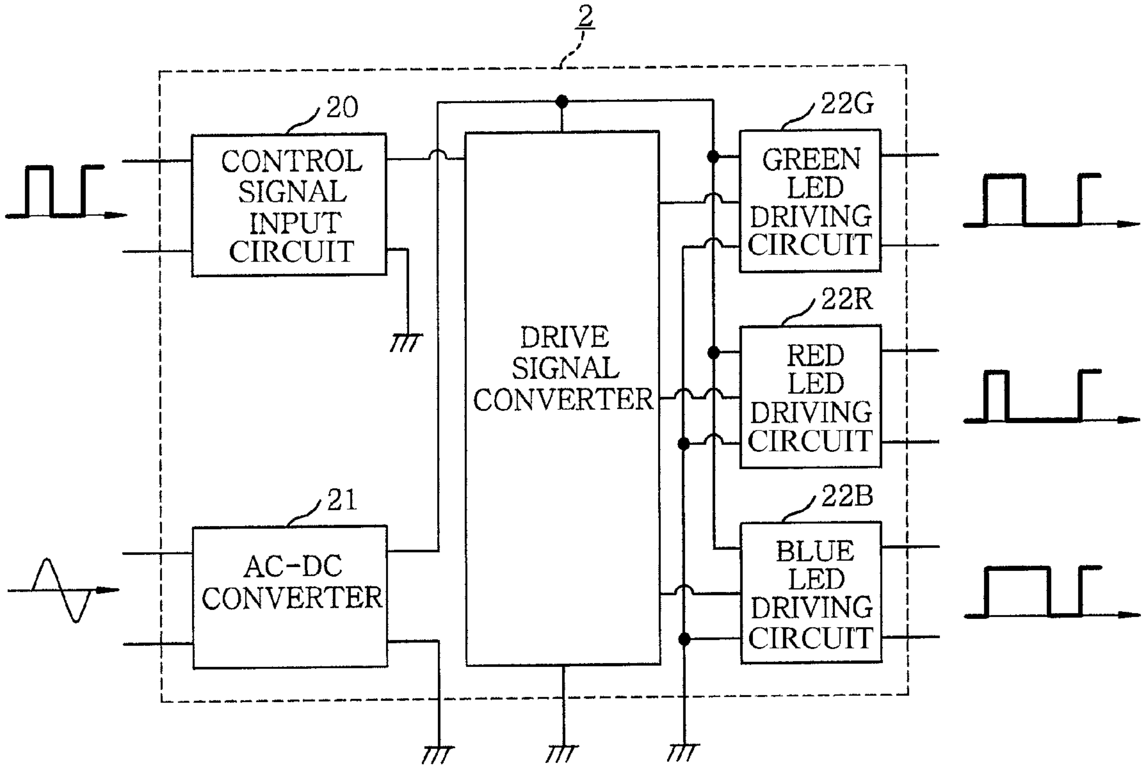
FIG. 1B is a block diagram showing a power supply that can be used with the illumination device of FIG. 1A.

As shown in FIG. 1B, the power supply 2 in an embodiment may include a control signal input circuit 20 to which control signals are input from the controller 1, and an AC-DC converter 21 also coupled to the controller 1. Further, the power supply 2 includes a green-LED driving circuit 22G for driving the green light-emitting element 3G, a red-LED driving circuit 22R for driving the red light-emitting element 3, a blue-LED driving circuit 22B for driving the blue light-emitting element 3B, and a drive signal converter 23 for converting the control signals which are input to the control signal input circuit 20 into drive signals which are to be applied to the green-LED driving circuit 22G, the red-LED driving circuit 22R and the blue-LED driving circuit 22B.

Figure 1C:
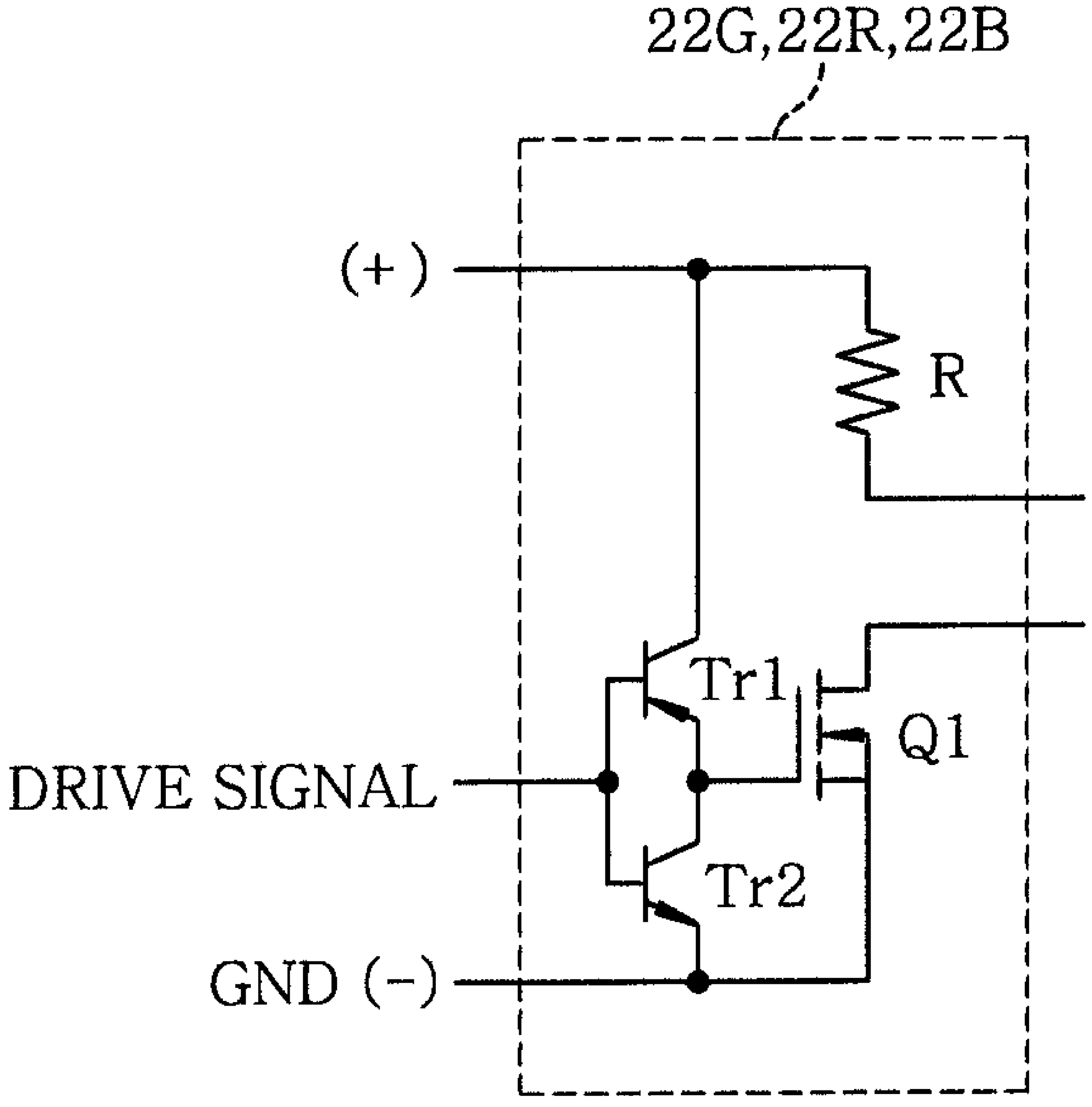
FIG. 1C is a circuit diagram of an LED driving circuit of the power supply.

The three driving circuits 22G, 22R and 22B may have a common configuration. In an embodiment as shown in FIG. 1C, each of the driving circuits 22G, 22R and 22B includes a current limit (CL) resistor R arranged between the high-potential output terminal of the AC-DC converter 21 and the anode of respective light-emitting elements 3R, 3G and 3B, a switching element Q1, e.g., a field effect transistor or MOSFET, the source of which is connected to the cathode of each of the light-emitting elements 3R, 3G and 3B and the drain of which is connected to the low-potential output terminal (or ground) of the AC-DC converter 21, and a waveform shaping circuit for shaping the waveforms of the drive signals output from the drive signal converter 23.

Such waveform shaping circuits are well-known in the art and may include in an embodiment a PNP-type bipolar transistor Tr1, a collector of which is connected to the high-potential output terminal of the AC-DC converter 21 and an emitter of which is connected to the gate of the switching element Q1, and an NPN-type bipolar transistor Tr2, a collector of which is connected to the gate of the switching element Q1 and an emitter of which is connected to ground. The waveform shaping circuit shapes the waveform of the drive signal input to the bases of the two parallel connected transistors Tr1 and Tr2 and outputs the shaped drive signal to the gate of the switching element Q1.

In the embodiment shown, the drive signal converter 23 outputs drive signals, i.e., rectangular waveform signals, having a specified period and a variable duty ratio, thereby controlling the switching element Q1 of each of the driving circuits 22G, 22R and 22B on a PWM (pulse width modulated) basis and adjusting the amount of current supplied to the light-emitting elements 3R, 3G and 3B.

The controller 1 may in an embodiment include a housing 10 formed of a box-like synthetic resin molded product. A control setting module 11 and a user-accessible button 12 for manipulating a power supply switch are arranged on the front surface of the housing 10 (see FIG. 1A). The power supply switch (not shown) may be formed of a tumbler switch or a push button switch for example and serves to open and close a power supply path extending from an alternating current source AC to the power supply 2.

Accommodated within the housing 10 may be a variable resistor, or potentiometer, (not shown) whose resistance value is changed upon user manipulation of the control setting module 11, an A/D converter (not shown) for analog to digital conversion of the resistance value of the variable resistor, and a control signal generator (not shown) for generating control signals based on the resistance value which has been converted to a digital value by the A/D converter.

The control setting module 11 in the embodiment shown in FIG. 1B for example is rotatable with respect to the housing 10 over a range of about 315 degrees (7/4•) and has a mark 11*a* formed on the front surface thereof. The resistance value of the variable resistor becomes smallest when the mark 11*a* is in the six o'clock position and greatest when mark 11*a* is in the middle position (four thirty o'clock position) between the four o'clock position and the five o'clock position. Upon rotating the control setting module 11 clockwise and counterclockwise between the six o'clock position and the four-thirty o'clock position, the resistance value of the variable resistor is adjusted linearly. The control amount of the control setting module 11 (the position of the mark 11*a*) may be observed from the resistance value.

The control signal generator generates control signals (PWM signals) having duty ratios corresponding to the resistance values between the minimum value and the maximum value of the variable resistor in a one-to-one relationship. The control signals thus generated are output to the power supply 2. Although the control amount of the control setting module 11, i.e., the duty ratios of the control signals, corresponds to the color (color temperature) of the illuminating light of the light source 3, the amount of change in the color temperature of the illuminating light does not coincide with the amount of change in the light color as perceived by the human eye.

More specifically, even if the amount of change (e.g., 100 K) in a relatively low color temperature (e.g., 2800 K) is equal to the amount of change in a relatively high color temperature (e.g., 4500 K), the change in the relatively high color temperature is hard to perceive while the change in the relatively low color temperature is easy to perceive. For that reason, if the control amount of the control setting module 11 is merely proportional to the amount of change in the color temperature, a discrepancy occurs between the change in the adjusted color temperature and the change in the color temperature actually perceived. This makes it inconvenient to use the illumination device in such a manner.

It is well-known in the art that the human eye does not perceive a change in light color if a difference of the inverse color temperature ($MK^{-1}$ (per mega Kelvin) or mired, which is one million times ($10^6$) the inverse of the color temperature), remains the same in the course of adjusting the color temperature. In an embodiment, therefore, the corresponding relation between the control amount (deg) of the control setting module 11 and the inverse color temperature is set to ensure that the amount of change in the control input (the difference of the control amount of the control setting module 11) has a proportional relationship with the difference of the inverse color temperature (or the difference of the duty ratio of the control signal) as indicated by straight line A in FIG. 2B.

Figures 2A, 2B:
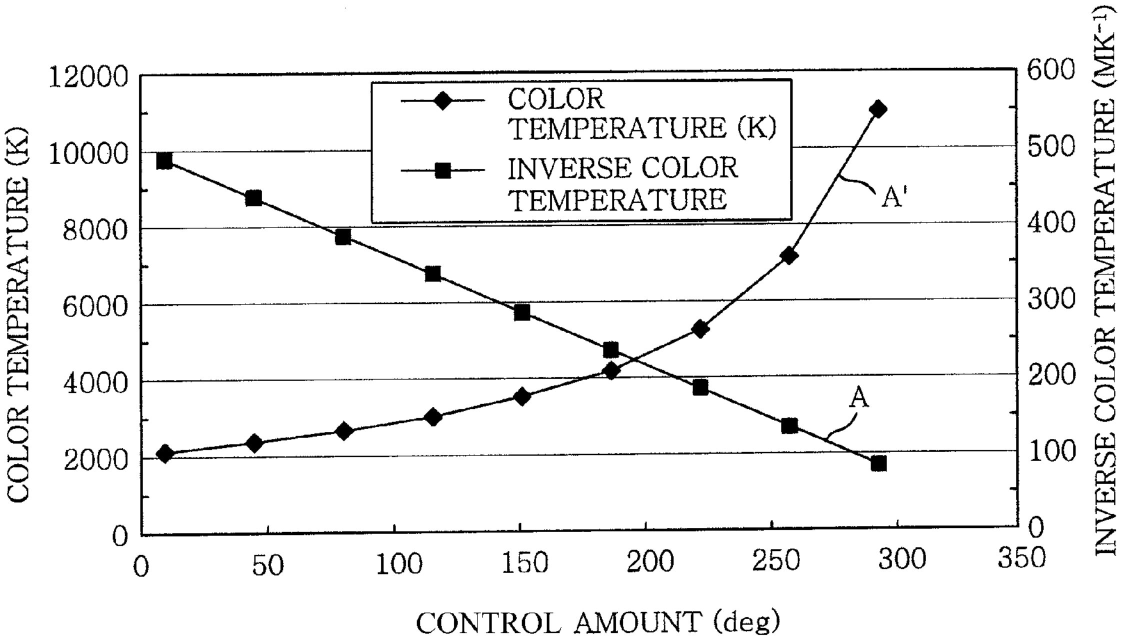
FIGS. 2A and 2B are graphical diagrams illustrating the relationship between the amount of operation of a control setting module and color temperature in the illumination device of FIG. 1A.

In other words, the inverse color temperature corresponding to the control amount (or the resistance value) is set so that, when the control amount of the control setting module 11 is changed in specified increments (e.g., about 36 deg), the corresponding increments in the inverse color temperature become a substantially constant value (e.g., about 50±3) as can be seen in FIG. 2A.

In the power supply 2, the control output signals generated by the controller 1 are converted by the control signal input circuit 20 to DC voltage signals having a voltage level corresponding to a desired duty ratio (or the inverse color temperature). In the drive signal converter 23, the DC voltage signals are converted to drive signals to be supplied to the LED driving circuits 22G, 22R and 22B.

The drive signal converter 23 in various embodiments includes a microcomputer and a memory. Stored in the memory are conversion tables (i.e., look-up tables) that indicate the corresponding relation between the level of the DC voltage signals (or the inverse color temperature), the color temperature inversely calculated from the inverse color temperature, the chromaticity coordinates ($x_0$, $y_0$) of the color of the illuminating light corresponding to the color temperature, the ratio of the light quantities $Y_R$, $Y_G$ and $Y_B$ of the respective light-emitting elements 3R, 3G and 3B corresponding to the chromaticity coordinates, and the light quantities $Y_R$, $Y_G$ and $Y_B$ of the light-emitting elements 3R, 3G and 3B. The DC voltage signals are converted to the drive signals by the microcomputer based on the conversion table.

The color and the quantity of the illuminating light can be controlled independently of each other. As mentioned previously, however, the psychological effect varies with luminance even if the color temperature remains the same. For that reason, when a user wishes to obtain a desired psychological effect (or a desired Kruithof effect), it is quite difficult to properly control both the color (or color temperature) of the illuminating light and the luminance independently of each other.

Figure 8:
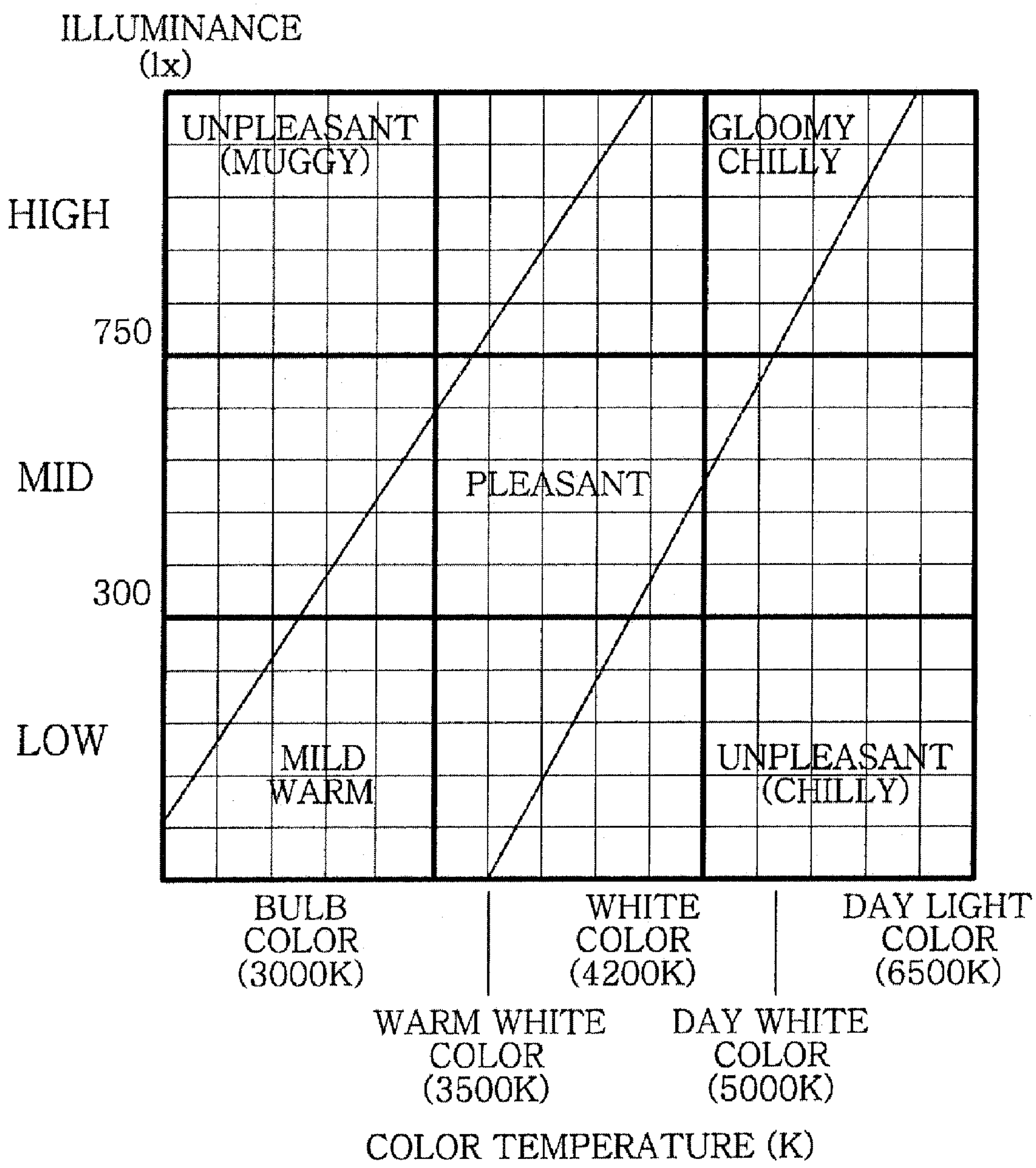
FIG. 8 (PRIOR ART)
FIG. 8 is a graphical diagram explaining a psychological effect (or a Kruithof effect) relating to the color temperature and luminance of a light sample.

In view of the Kruithof effect as illustrated in FIG. 8, it is preferable that the light quantity is increased along with the increase in the color temperature in order to realize a psychologically pleasant illumination environment. In the low color temperature region (e.g., the color temperature region of about 2800 K or less which is the color temperature of an incandescent lamp), it is preferable to simulate the characteristics of the luminance and the color (or the color temperature) of the illuminating light obtainable by dimming an incandescent lamp.

In the middle and high color temperature regions, the light quantity may be increased along with the increase in the color temperature. For the purpose of general illumination, it is sufficient if a light quantity of a rated level or so is obtainable. From the standpoint of energy saving, it is not desirable to increase the light quantity beyond a rated level with respect to the light source (designated as 100% throughout the figures). Therefore, it is preferable that the light quantity is kept substantially constant in the color temperature region higher than a specified color temperature (e.g., 2800 K, the color temperature of an incandescent lamp as described previously).

In the high color temperature region, the percentage of the light quantity $Y_B$ of the blue light-emitting element 3B becomes higher than the light quantity $Y_R$ or $Y_G$ of the light-emitting element 3R or 3G, but the light emission efficiency of the blue light-emitting element 3B is lower than that of the light-emitting element 3R or 3G. This sometimes makes it difficult to increase the color temperature of the illuminating light while keeping the quantity $Y_0$ thereof constant. Therefore, it is preferable that, in the color temperature region equal to or higher than a specified color temperature (e.g., 2800 K), the light quantity is actually reduced to some extent along with the increase in the color temperature.

Figure 3A:
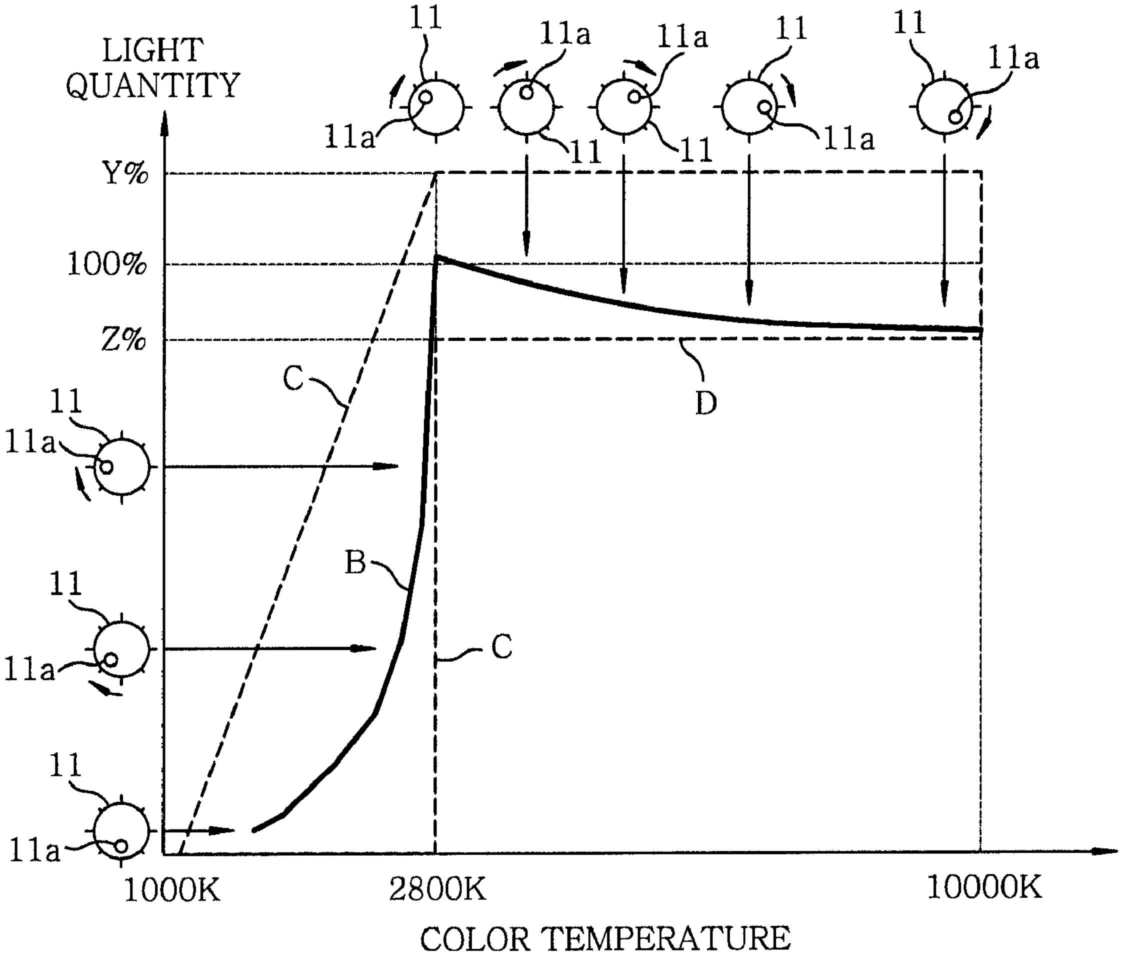
FIGS. 3A to 3D are graphical diagrams illustrating various operations of the illumination device of FIG. 1A.

In various embodiments, therefore, the light quantities $Y_R$, $Y_G$ and $Y_B$ of the light-emitting elements 3R, 3G and 3B are determined as indicated by curve B in FIG. 3A. Accordingly, in a specified color temperature range (e.g., a range of lower than about 2800 K in an embodiment as shown), the color temperature and the light quantity can be increased or decreased together in conjunction with the control amount of the control setting module 11 and so that, in a color temperature range of 2800 K or more, the color temperature of the illuminating light can be increased or decreased in conjunction with the control amount of the control setting module 11 while the quantity of the illuminating light is kept within a specified range (e.g., a range of from Z % to Y % on the assumption that the rated light quantity is 100%, where Y is from about 110% to about 120% and Z is from about 80% to about 90%).

The values (or the positions) of the characteristic curve B corresponding to the control amounts of the control setting module 11 divided by 45 deg (1/4•) are designated by arrows in FIG. 3A. The characteristic curve B illustrated in FIG. 3A is merely one illustrative example of the same and is not limiting on the scope of the present invention.

In a specified color temperature range (e.g., a range of lower than about 2800 K), the color temperature-light quantity characteristics of the illuminating light may be set to fall within the triangular area generally surrounded by dashed lines C.

In a color temperature region equal to or higher than a specified color temperature, the color temperature-light quantity characteristics of the illuminating light may alternatively be set to fall within the rectangular area surrounded by dashed lines D. The upper and lower limit values of the color temperature are not however intended to be limited to the values (e.g., 1500 K and 10000 K) illustrated in FIG. 3A.

More specifically, referring to the characteristic curve B in FIG. 3A, a relation between the color temperature and light quantity is different in the range of the specified color temperature (2800 K) or more. The curve B presents the color temperature-light quantity characteristics in a case when a control operation is performed to keep a total power consumption of a blue LED, a red LED and a green LED constant. Herein, the electric power consumptions of each of the blue LED, the red LED and the green LED are the same but light quantities of each of the blue LED, the red LED and the green LED are different.

It is known from a conventional luminosity factor curve that a luminosity factor is lower where, for example, a blue wavelength is prominent as opposed to the case where the color lights are equally distributed. As seen from the curve B shown in FIG. 3A, above the specified color temperature (2800 K) the light quantity decreases along with increasing of the color temperature. This is because a ratio of the blue light becomes higher and, as a result, the light quantity is lowered.

Figure 3B:
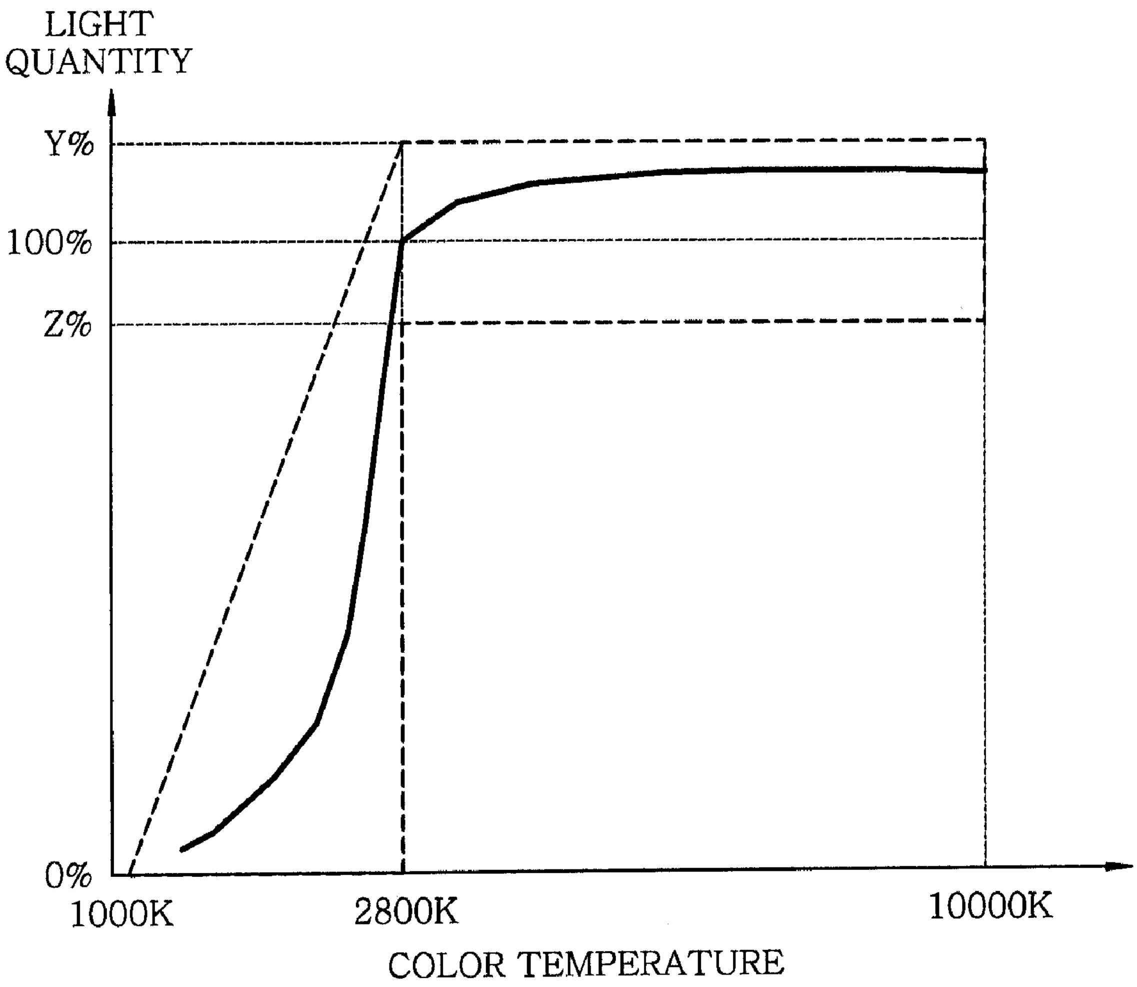

A characteristic curve shown in FIG. 3B illustrates the color temperature-light quantity characteristics in a control operation to maintain a substantially constant light quantity while varying the color temperature in a range of the specified color temperature (i.e., 2800 K) or more. This is a preferable control range because the light quantity (and by extension the luminance) remains substantially the same while the color temperature changes.

Figure 3C:
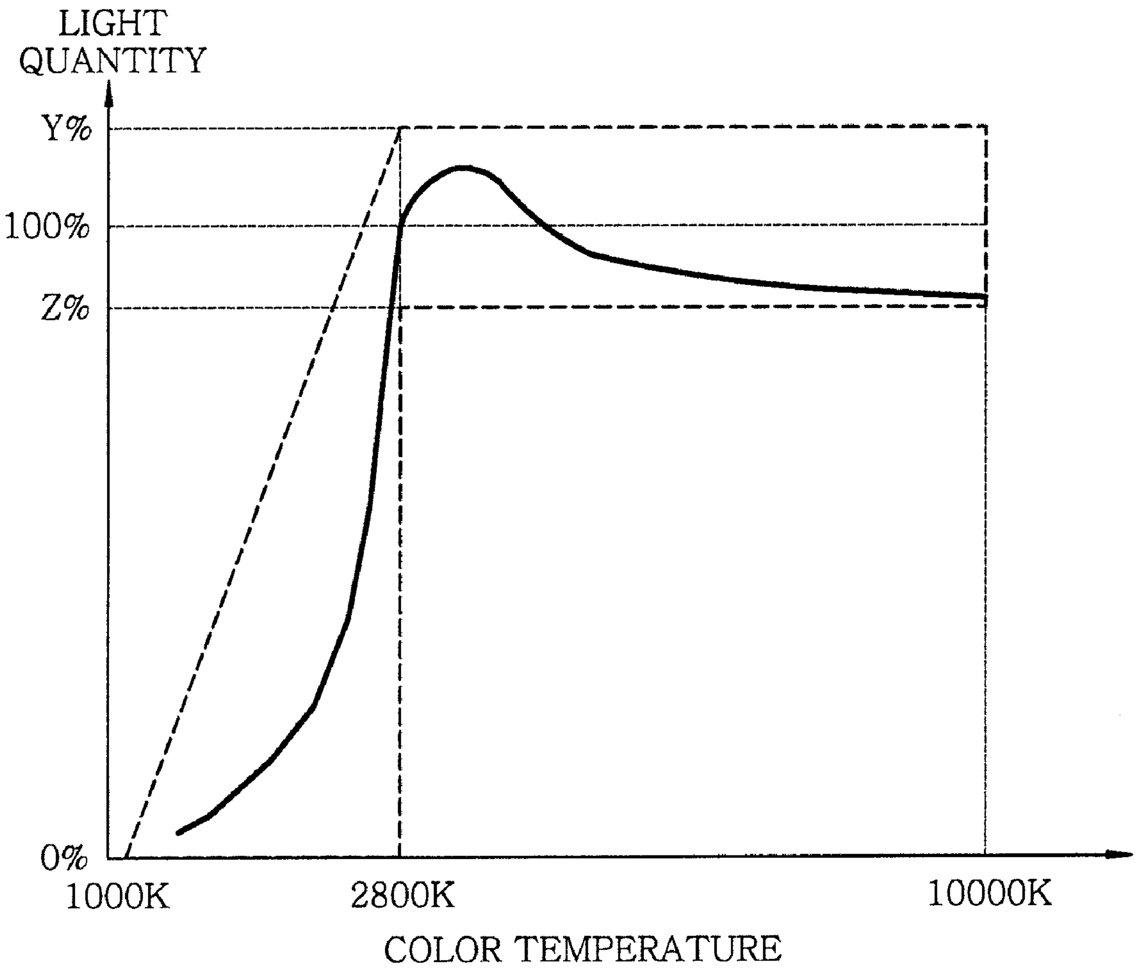

Referring to FIG. 3C, an overshoot is illustrated along the described control range and just above the specified color temperature in the color temperature-light quantity characteristics. This occurs because in a control operation as shown, the light quantity rapidly increases along with increasing color temperature in a range lower than the specified color temperature. However, it is quite difficult to control a light quantity to be constant immediately upon exceeding the specified color temperature. Therefore, it may be necessary to allow for an overshoot within a particular range, e.g., from Y % to Z %.

Figure 3D:
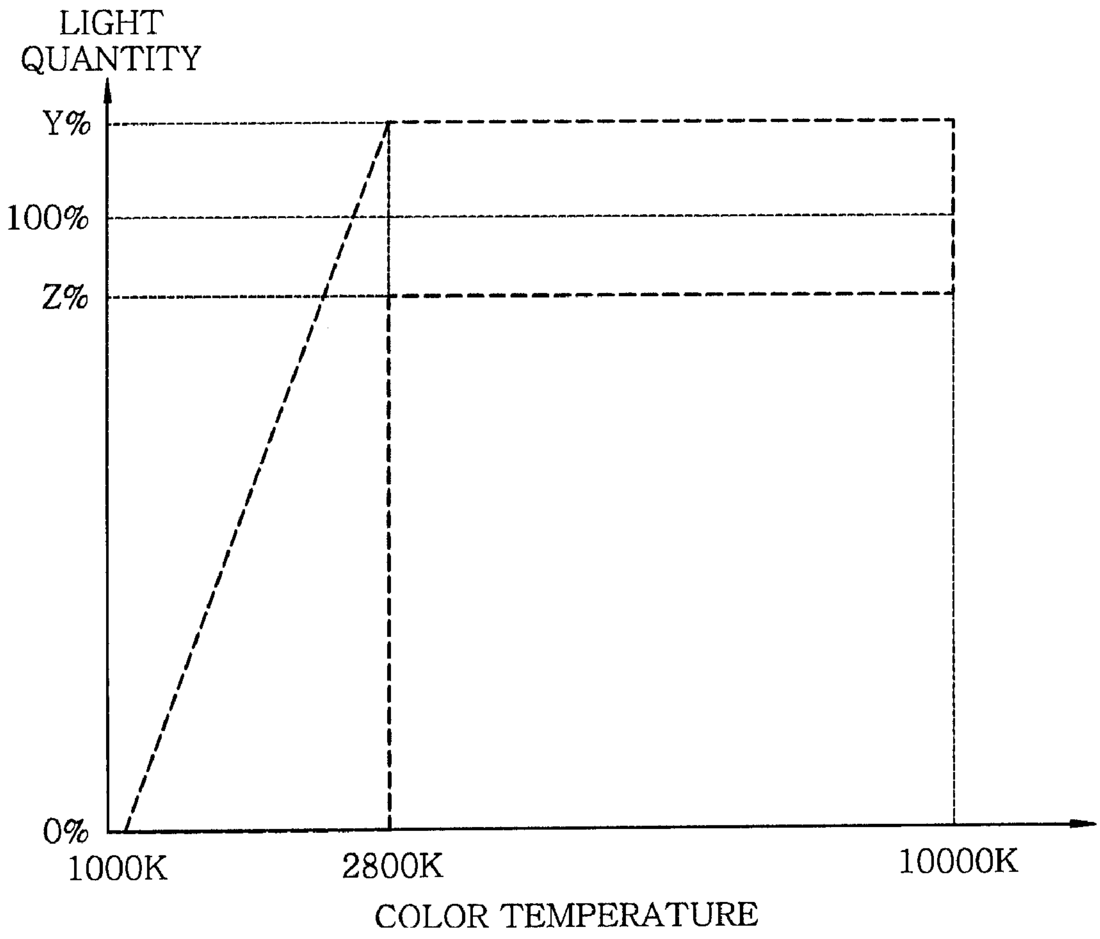

In an embodiment, a desired control operation for the color temperature and the light quantity may be explained based on the characteristic curves shown in FIGS. 3B and 3C, but it is not limited thereto and may include any other controls as long as a desired control is in a range of color temperature-light quantity as shown by the dashed line in FIG. 3D.

In the aforementioned operation, the drive signal converter 23 converts the control signals to the drive signals to produce the following results. If the control setting module 11 of the controller 1 is operated between the six o'clock position and the ten thirty o'clock position, the color temperature of the illuminating light is increased or decreased within a range between the minimum value (about 1500 K) and the specified color temperature (2800 K) depending on the control amount (or the position of the mark 11*a*) of the control setting module 11. Furthermore, the quantity $Y_0$ of the illuminating light is increased along with increasing of the color temperature.

If the control setting module 11 of the controller 1 is operated between the ten thirty o'clock position and the four thirty o'clock position, the color temperature of the illuminating light is increased or decreased within a range between the specified color temperature (2800 K) and the maximum value (10000 K). Furthermore, the quantity $Y_0$ of the illuminating light is decreased along with increasing of the color temperature.

In the embodiment described, when the control input is received by the controller 1, a light quantity determination circuit (including a control signal generator of the controller 1, the control signal input circuit 20 of the power supply 2 and the drive signal converter 23 of the power supply 2) determines the light quantities $Y_R$, $Y_G$ and $Y_B$ of the light-emitting elements 3R, 3G and 3B so that, in a range lower than a specified color temperature, the color temperature and the quantity of the illuminating light can be increased or decreased together in conjunction with the change in the control input (or the control amount of the control setting module 11). Further, the light quantity determination circuit determines the light quantities $Y_R$, $Y_G$ and $Y_B$ of the light-emitting elements 3R, 3G and 3B so that, in a range equal to or higher than the specified color temperature, the color temperature of the illuminating light can be increased or decreased in conjunction with the change in the control input while the quantity of the illuminating light is kept within a specified range.

This enables a user to adjust the color (or the color temperature) and the quantity of the illuminating light in an easier manner than in a conventional illumination device where the light quantities of the respective colors are independently adjusted by a user. Moreover, the corresponding relation between the control amount of the control setting module 11 and the color temperature is set to ensure that the difference of the control amount of the control setting module 11 has a proportional relationship with the difference of the inverse color temperature (or the duty ratio of the control signal). Thanks to this feature, no discrepancy occurs between the change in the control input by the control setting module 11 and the change in the color temperature actually perceived, thereby enhancing the ease of use of the illumination device.

In the case where the duty ratio of the control signal has a corresponding relation with the color temperature rather than the inverse color temperature, the control signal generator of the controller 1 may generate a control signal so that the duty ratio of the control signal (or the color temperature) can be generally exponentially changed with respect to the control amount of the control setting module 11 as indicated by curve A' in FIG. 2B.

Alternatively, the color temperature and the light quantity might be adjusted independently. As mentioned previously, however, in order to potentially apply the conventional illumination device using an incandescent lamp as a light source, the color temperature-light quantity characteristics of the illuminating light preferably simulate those of the incandescent lamp.

Figure 9A:
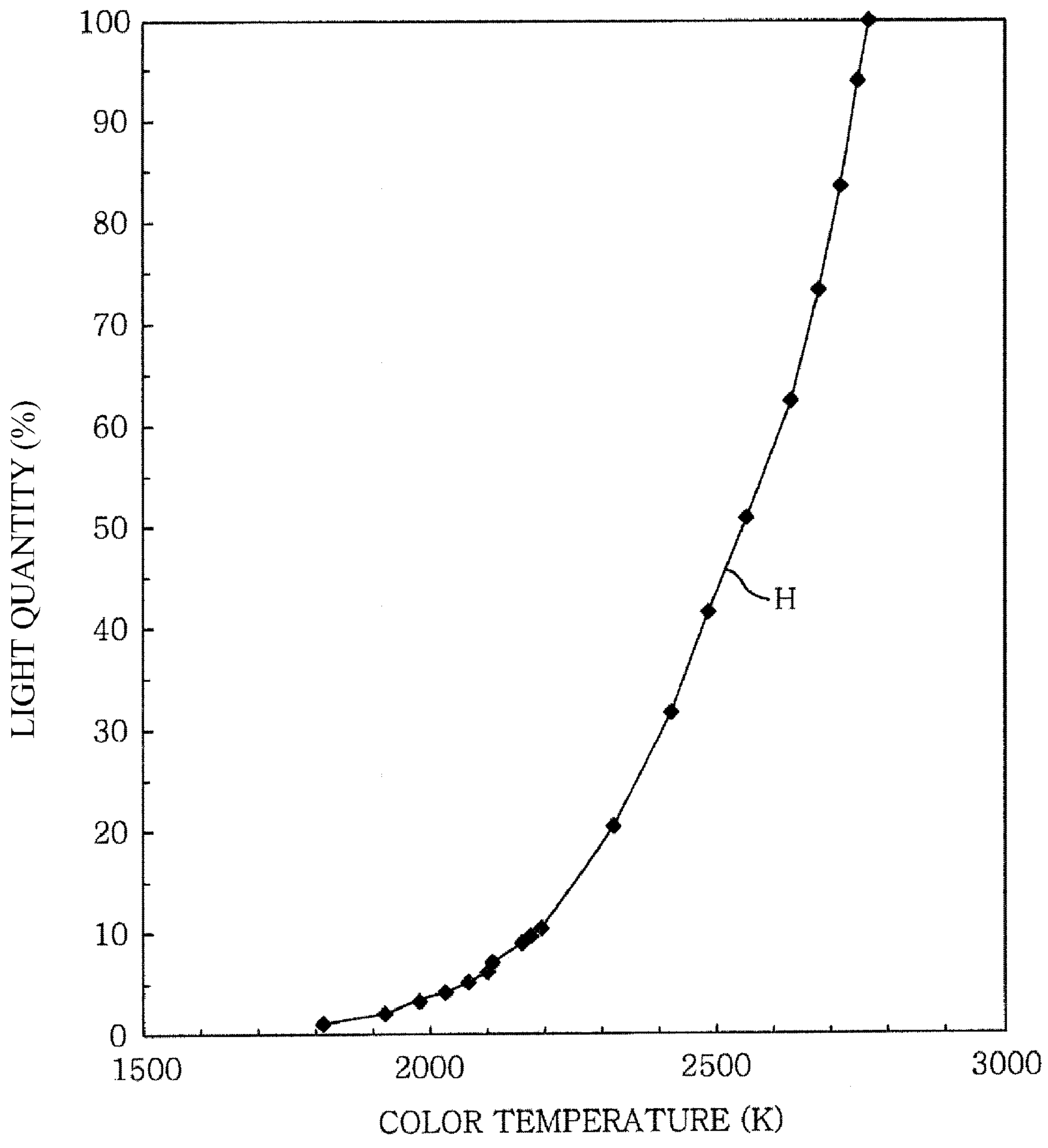
FIG. 9A (PRIOR ART)
FIGS. 9A and 9B are graphical diagrams explaining a relationship between the color temperature and luminance of a light sample.
Figure 9B:
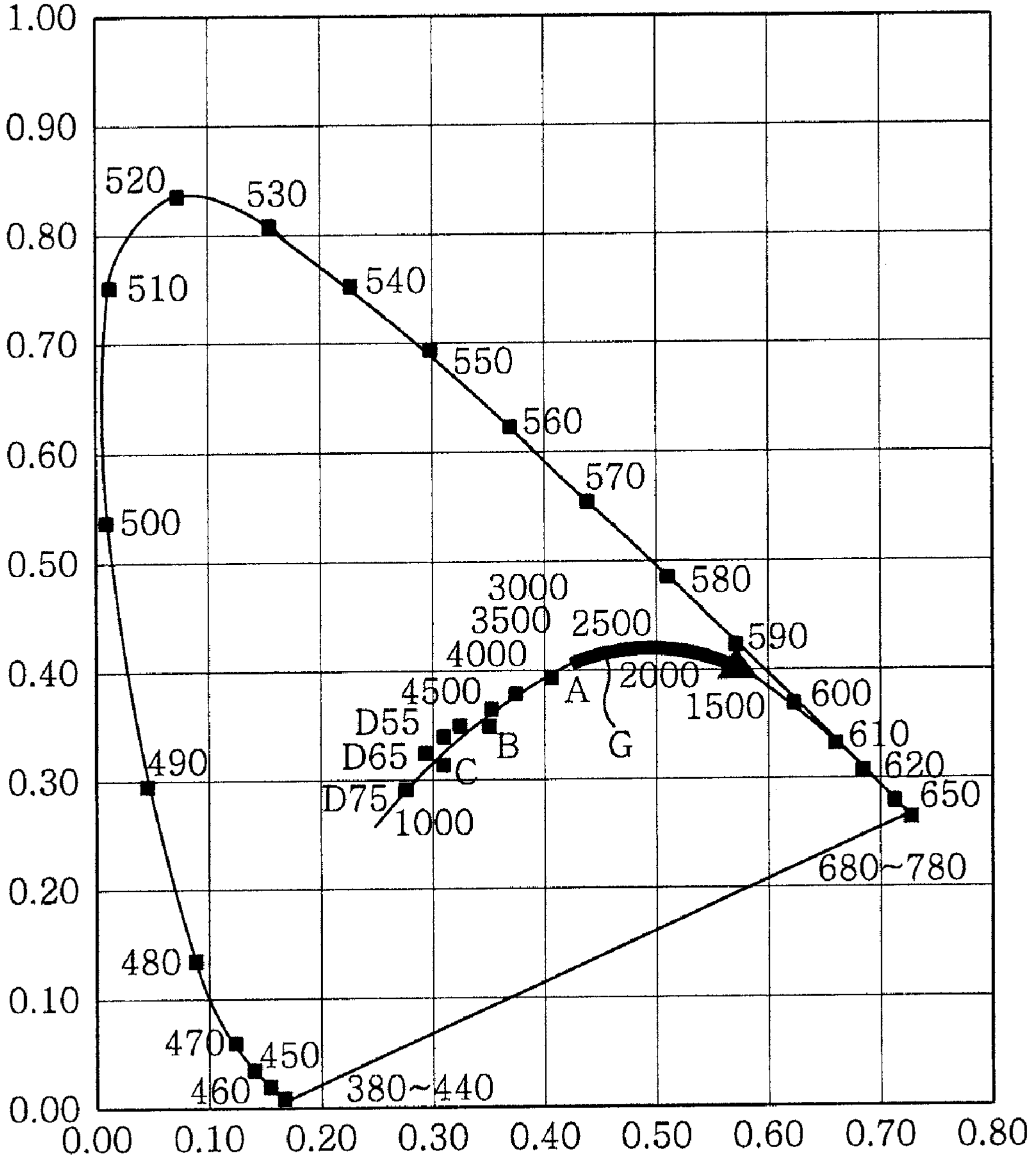
FIG. 9B (PRIOR ART)

With this in mind, light quantities $Y_R$, $Y_G$ and $Y_B$ of each of light-emitting diodes 3R, 3G and 3B may be determined so that, in a range of lower than the color temperature (e.g., about 2800 K for a conventional mini halogen lamp) of the incandescent lamp, a color temperature and a light quantity of illuminating light are increased or decreased in conjunction with an control amount of the control setting module 11, and a chromaticity of the illuminating light changes approximately along the blackbody locus (see, e.g., curve G in FIG. 9B), similar to the color temperature-light quantity characteristics of the incandescent lamp shown by curve H in FIG. 9A, and so that a change in the color temperature when the light quantity $Y_0$ is relatively small is greater than when the light quantity $Y_0$ is relatively large.

Thus, the drive signal converter 23 may convert the control signals to the drive signals so that the color temperature, the chromaticity and the light quantity of the illuminating light can be adjusted as mentioned above, depending on the control amount (the position of mark 11*a*) of the control setting module 11.

When the control input is received by a control input receiving circuit (including the control setting module 11, the variable resistor and the A/D converter of the controller 1), the light quantity determination circuit (including a control signal generator of the controller 1, the control signal input circuit 20 and the drive signal converter 23 of the power supply 2) determines the light quantities $Y_R$, $Y_G$ and $Y_B$ of the light-emitting elements 3R, 3G and 3B so that, in a range of lower than the specified color temperature or threshold color temperature (e.g., about 2800 K in the embodiment shown) of the illuminating light, the color temperature and the light quantity can be increased or decreased together in conjunction with the change in the control input (or the control amount of the control setting module 11), so that the chromaticity of the light changes approximately along the blackbody locus, and so that a change in the color temperature when the light quantity $Y_0$ is relatively small is greater than when the light quantity $Y_0$ is relatively large. Therefore, even if the light source 3 is made up of light-emitting diodes, a color temperature and a light quantity can be adjusted to present a feature approximate to the color temperature-light quantity characteristics of an incandescent lamp.

Figure 4:
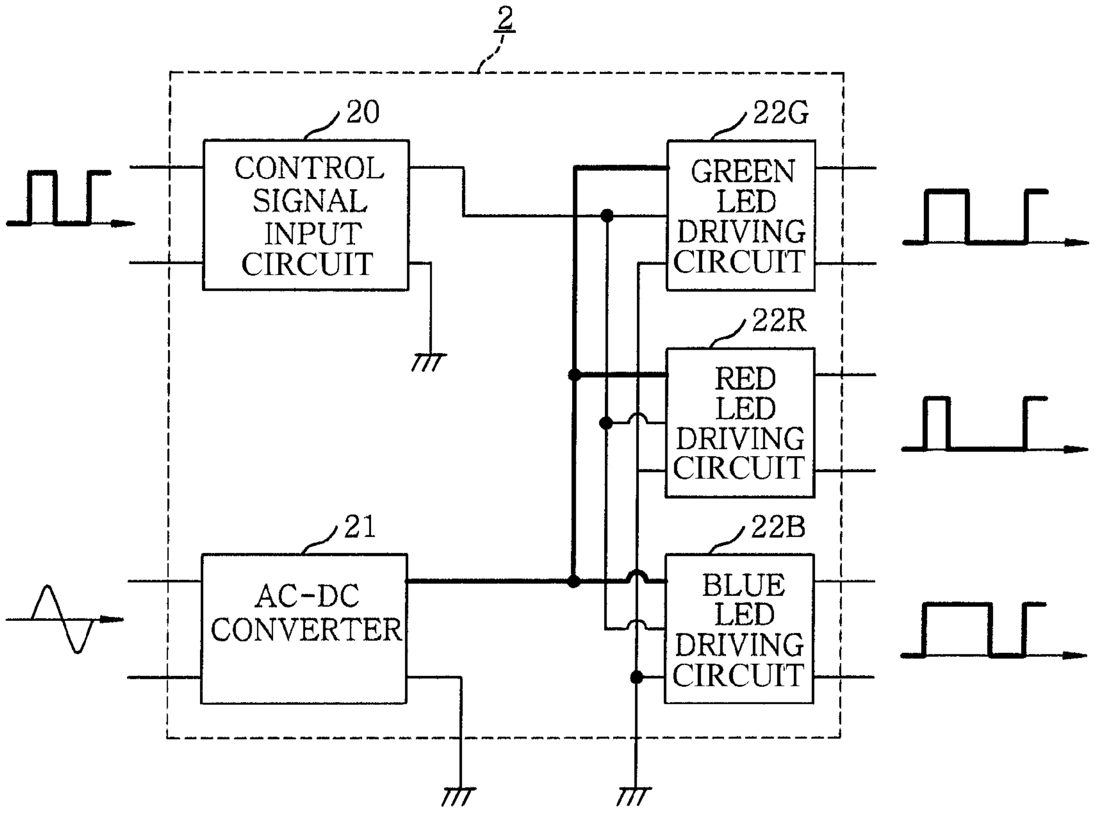
FIG. 4 is a block diagram showing another embodiment of the power supply of the present invention.

Referring now to FIG. 4, in one embodiment the power supply 2 has a configuration wherein the drive signal converter 23 is omitted, and the conversion of the DC voltage output signals from the control signal input circuit 20 to the drive signals for the LED driving circuits 22G, 22R and 22B are consolidated into the LED driving circuits 22G, 22R and 22B.

Figure 5A:
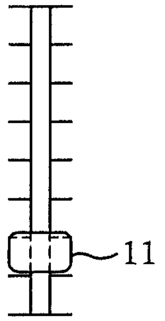
FIGS. 5A through 5E are plan views showing various embodiments of control setting modules employed in the illumination device of FIG. 1A.

The controller 1 is not limited to a type in which a control setting module 11 is rotated to change the resistance value of the variable resistor. As alternative examples, the controller 1 may be of the type in which a control setting module 11 is a slider that is moved vertically as shown in FIG. 5A to change the resistance value of the variable resistor (or potentiometer) or the type in which a control setting module 11 is a slider that moves horizontally as shown in FIG. 5B to change the resistance value of the variable resistor.

Figure 5B:
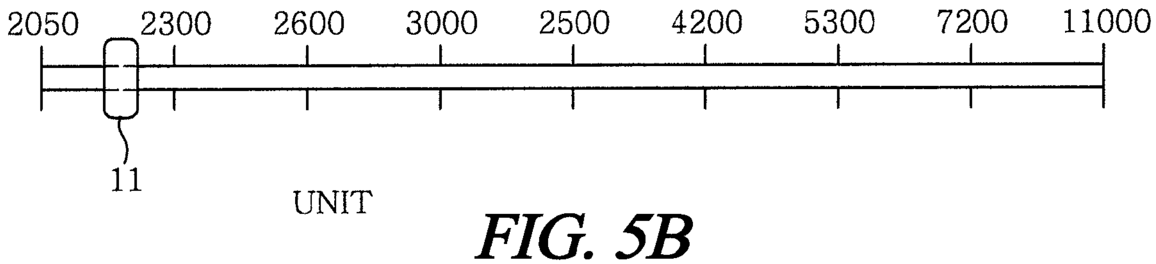

In addition, figures indicative of the color temperature corresponding to the control amount of the slidable control setting module 11 may be defined on the front surface of the housing 10 as shown in FIG. 5B. In this case, the numerical values of the figures (or the color temperature) spaced apart in a regular interval are selected so that the spacing of the figures can have a proportional relationship with the difference of the inverse color temperature.

Figure 5C:
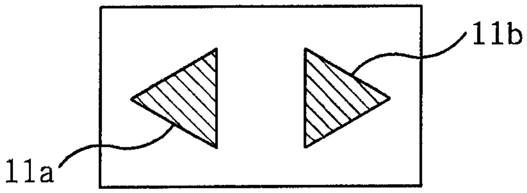
Figure 5D:
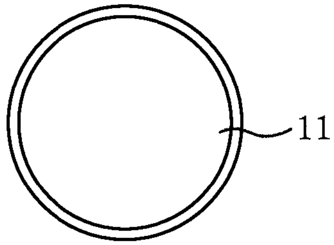

Alternatively, the controller 1 may have either a configuration in which a pair of control setting modules 11*a* and 11*b* each having a triangular shape when seen in a plan view is provided on the front surface of the housing 10 as shown in FIG. 5C so that a pair of push button switches (not shown) accommodated within the housing 10 can be manipulated with the control setting modules 11*a* and 11*b*. In a further configuration, a cylindrical control setting module 11 is angularly positioned on and relative to the front surface of the housing 10 as shown in FIG. 5D so that a push button switch (not shown) accommodated within the housing 10 can be manipulated by pressing one of the left, right, upper and lower ends of the control setting module 11 at the front side and eventually adjusting the angle of the control setting module 11 relative to the front surface of the housing 10. In this case, the control amount of the control setting module 11 is equivalent to the time for which the push button switch is held down or otherwise continuously manipulated.

Figure 5E:
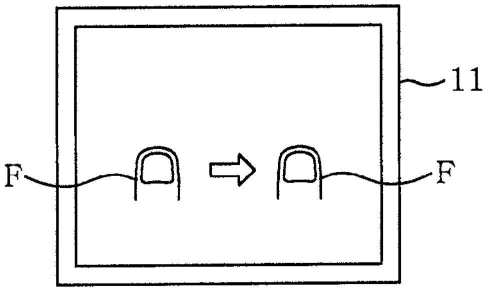

As a further alternative example, the controller 1 may have a configuration in which a control setting module 11 is formed of a capacitive touch sensor provided on the front surface of the housing 10 as shown in FIG. 5E so that the operating surface (i.e., the sensor surface) of the control setting module 11 can be touched with a finger F along a horizontal direction and a vertical direction. In this case, the control amount of the control setting module 11 is equivalent to the moving distance of the finger F on the operating surface of the control setting module 11.

Figure 6A:
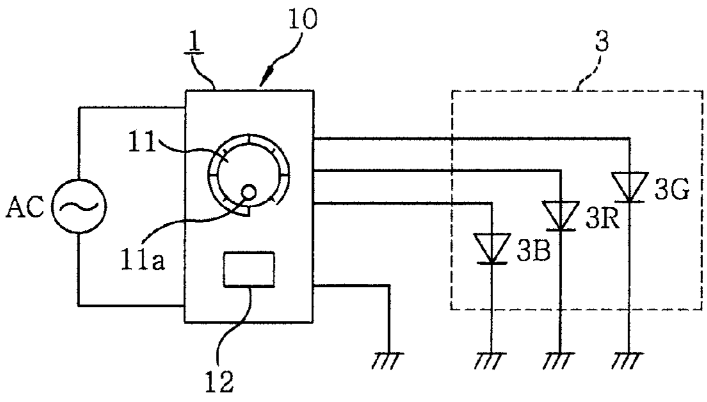
FIG. 6A is a block diagram showing another embodiment of an illumination device of the present invention.
Figure 6B:
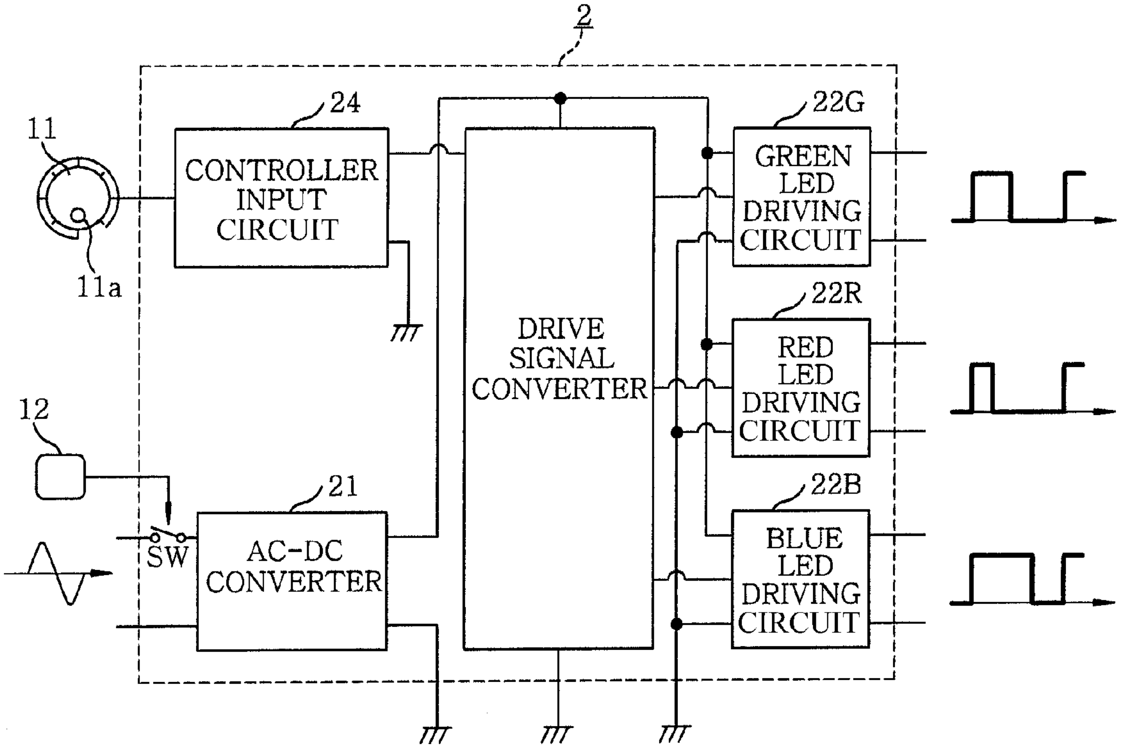
FIG. 6B is a block diagram showing an embodiment of a power supply used with the illumination device of FIG. 6A.

Referring now to FIGS. 6A and 6B, in an embodiment the illumination device is characterized in that the power supply 2 is built into the housing 10 of the controller 1. This illumination device otherwise has the same basic configuration as that of the illumination device of FIG. 1A. Therefore, the shared components will be designated by like reference characters and will be omitted from description.

A variable resistor (or potentiometer, not shown) whose resistance value is changed upon manipulating the color temperature control setting module 11, an A/D converter (not shown) for analog to digital conversion of the resistance value of the variable resistor, and a controller input circuit 24 for generating a DC voltage signal corresponding to the inverse color temperature (or the color temperature) based on the resistance value which has been converted to a digital value in the AC-DC converter, are each further accommodated within the housing 10 rather than the control signal input circuit 20.

The DC voltage output signal from the controller input circuit 24 is the same as the DC voltage output signal from the control signal input circuit 20 of FIG. 1B. In FIG. 6B, there is shown a power switch SW which is not shown in the embodiment of FIG. 1B.

Referring back to the embodiments shown FIGS. 1A to 1C, the controller 1 and the power supply 2 are installed independently of each other and need to be connected to each other by a power feeding wire and a control signal transmitting wire. In the embodiments shown in FIGS. 6A and 6B, however, providing the controller 1 and the power supply 2 in a consolidated form makes it possible to omit these wires.

Figure 7:
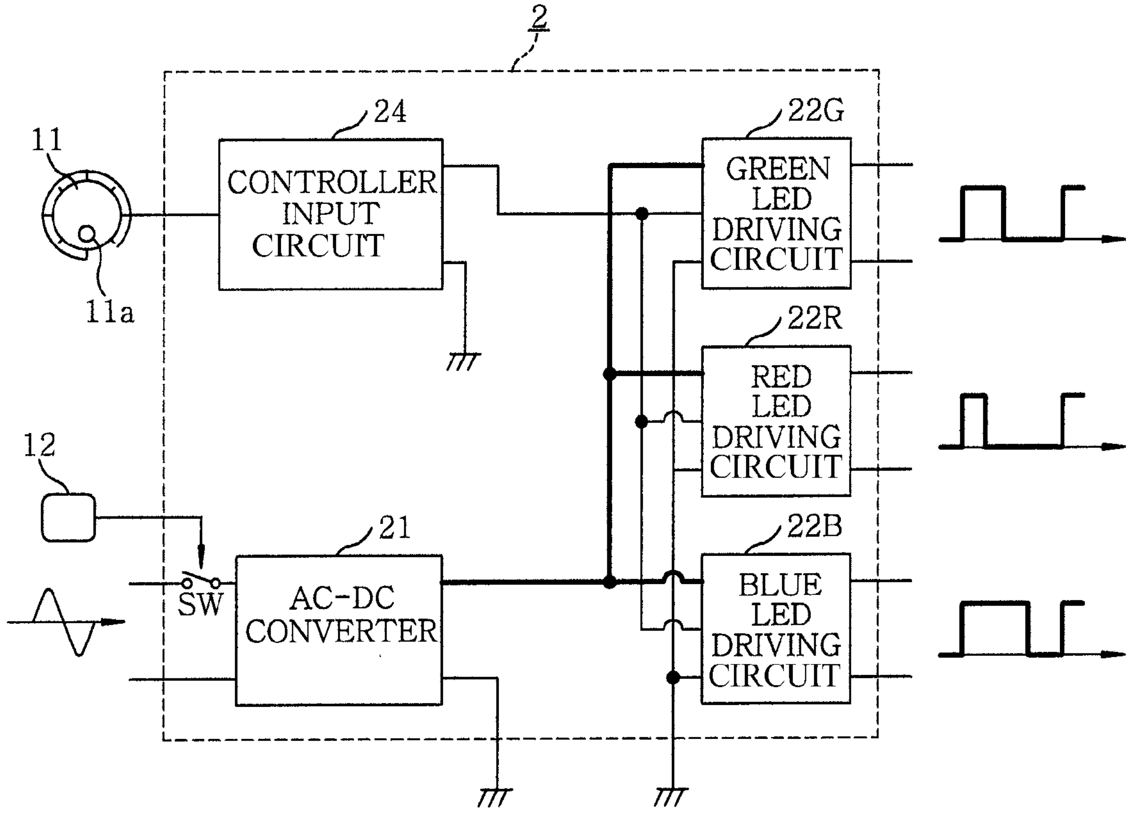
FIG. 7 is a block diagram showing another embodiment of the power supply of the illumination device of FIG. 6A.

In an embodiment as shown in FIG. 7, the drive signal converter 23 is omitted from the power supply 2, and the functions of converting the DC voltage output signals from the controller input circuit 24 to the drive signals for the LED driving circuits 22G, 22R and 22B are consolidated into the LED driving circuits 22G, 22R and 22B.

In various embodiments as described above, the light source 3 includes three colors (three kinds), e.g., red, green, and blue light emitting diodes. However, the light source 3 is not limited thereto and may be made of two colors, e.g., white and red light emitting diodes, so that a light quantity and a color temperature can be varied to simulate a feature substantially approximating the color temperature-light quantity characteristics of an incandescent lamp by adjusting a ratio of a light quantity of a white light emitting diode and a light quantity of a red light emitting diode and an absolute value of the ratio. In this case, since the number of light emitting diodes to be controlled is decreased, a signal process can be simplified in the drive signal converter 23.

The previous detailed description has been provided for the purposes of illustration and description. Thus, although there have been described particular embodiments of the present invention of a new and useful "Illumination Device and Method for Controlling a Color Temperature of Irradiated Light," it is not intended that such references be construed as limitations upon the scope of this invention except as set forth in the following claims.

What is claimed is:

1. An illumination device comprising:

a light source including a plurality of light-emitting elements having different light colors;

a control setting module electrically coupled and functional to provide a control signal associated with a desired color temperature for light irradiated by the light source;

a light quantity determination circuit electrically coupled and functional configured to determine light quantities for each of the light-emitting elements based on a relationship between the control signal from the control setting module and an inverse color temperature;

a plurality of driver circuits electrically coupled and functional to provide driver signals to the light-emitting elements corresponding to the determined light quantities; and wherein the color temperature for light irradiated from the light source coincides with the desired color temperature.

2. The illumination device of claim 1, the light quantity determination circuit is further functional to determine the light quantities so that an increment in the control signal has a proportional relationship with an increment in the inverse color temperature.

3. The illumination device of claim 1, the light quantity determination circuit is further functional to determine the light quantities so that in a color temperature range lower than a specified color temperature the color temperature and the overall light quantity of light irradiated from the light source are increased or decreased together in conjunction with the increment in the control signal, and in a color temperature range equal to or higher than the specified color temperature the color temperature of light irradiated from the light source is increased or decreased in conjunction with the increment in the control signal while the quantity of light irradiated from the light source is kept within a specified range.

4. The illumination device of claim 3, the light quantity determination circuit is functional to determine the light quantities of the light-emitting elements so that the chromaticity of the light irradiated from the light source is changed substantially along a blackbody locus.

5. The illumination device of claim 4, the light quantity determination unit is functional to determine the light quantities of the light-emitting elements so that, in the color temperature range lower than the specified color temperature, the chromaticity of the light irradiated from the light source is changed substantially along the blackbody locus.

6. The illumination device of claim 4, the light quantity determination circuit is functional to determine the light quantities of the light-emitting elements so that in the color temperature range lower than the specified color temperature the color temperature and the quantity of the light irradiated from the light source are increased or decreased along with increasing or decreasing increments in the control signal, respectively, and so that in the color temperature range equal to or higher than the specified color temperature the color temperature of the light irradiated from the light source is increased or decreased along with increments in the control signal while the quantity of the light irradiated from the light source is kept within the specified range.

7. The illumination device of claim 1, the light quantity determination circuit is functional to determine the light quantities of the light-emitting elements so that the change in the color temperature when the quantity of light irradiated from the light source is relatively low becomes greater than the change in the color temperature when the quantity of light irradiated from the light source is relatively high.

8. The illumination device of claim 1, wherein the light-emitting elements each comprise a light-emitting diode.

9. The illumination device of claim 1, wherein the light-emitting elements each comprise an organic electroluminescent element.

10. A power supply for driving a light source having a plurality of light-emitting elements to irradiate light having a desired color temperature, the power supply comprising:

a controller input circuit and a control setting module, the controller input circuit electrically coupled and functional to receive an analog signal from the control setting module and to generate a DC control signal associated with the desired color temperature for light irradiated from the light source;

an AC-DC converter functional to convert received power from an AC source into DC power;

a drive signal converter electrically coupled and functional to receive the DC control signal and generate drive signals for each of the plurality of light-emitting elements, the drive signals corresponding to light quantities for each of the light-emitting elements, the light quantities determined wherein in a color temperature range lower than a specified color temperature the color temperature and an overall light quantity of light irradiated from the light source are increased or decreased together in conjunction with increments in the control signal, and in a color temperature range equal to or higher than the specified color temperature the color temperature of light irradiated from the light source is increased or decreased in conjunction with increments in the control signal while the quantity of light irradiated from the light source is kept within a specified range;

a plurality of driving circuits individually configured to drive each of the plurality of light-emitting elements based on an associated drive signal and DC power received from the AC-DC converter; and the light quantities are further determined wherein increments in the control signal have a proportional relationship with increments in the inverse color temperature.

11. The power supply of claim 10, the light quantities determined wherein increments in the control signal have an exponential relationship with increments in the color temperature.

12. The power supply of claim 10, the light quantities determined wherein the chromaticity of the light irradiated from the light source is changed substantially along a blackbody locus.

13. The power supply of claim 12, the light quantities determined wherein in the color temperature range lower than the specified color temperature the chromaticity of the light irradiated from the light source is changed substantially along the blackbody locus.

14. The power supply of claim 13, the light quantities determined wherein in the color temperature range lower than the specified color temperature the color temperature and the quantity of the light irradiated from the light source are increased or decreased along with increasing or decreasing increments in the control signal, respectively, and wherein in the color temperature range equal to or higher than the specified color temperature the color temperature of the light irradiated from the light source is increased or decreased along with increments in the control signal while the quantity of the light irradiated from the light source is kept within the specified range.

15. The power supply of claim 10, the light quantities determined wherein the change in the color temperature when the quantity of light irradiated from the light source is relatively low becomes greater than the change in the color temperature when the quantity of light irradiated from the light source is relatively high.

16. A method of controlling a color temperature for light irradiated from a light source having a plurality of light-emitting elements, the method comprising:

receiving a control signal indicative of a desired color temperature for the light irradiated from the light source;

determining light quantities for each of the plurality of light-emitting elements, the light quantities determined such that the color temperature of the light irradiated from the light source coincides with the desired color temperature, wherein when the color temperature is lower than a threshold color temperature the color temperature and an overall light quantity of light irradiated from the light source are increased or decreased together in conjunction with increments in the control signal, and wherein when the color temperature is equal to or higher than the threshold color temperature the color temperature of light irradiated from the light source is increased or decreased in conjunction with increments in the control signal while the quantity of light irradiated from the light source is kept within a specified range;

generating pulse width modulated drive signals for each of the light-emitting elements based on the control signals and the determined light quantities for the light-emitting elements;

driving each of the light-emitting elements in accordance with the generated drive signals and;

wherein a step of receiving a control signal indicative of a desired color temperature for the light irradiated from the light source further comprises receiving a positive or negative increment in a control signal having a proportionate relationship with a positive or negative increment in an inverse color temperature of a desired color temperature for the light irradiated from the light source.

17. The method of claim 16, wherein the step of receiving a control signal indicative of a desired color temperature for the light irradiated from the light source further comprises receiving a positive or negative increment in a control signal having an exponential relationship with a positive or negative increment in a desired color temperature for the light irradiated from the light source.

18. The method of claim 16, the light quantities determined wherein the chromaticity of the light irradiated from the light source is changed substantially along a blackbody locus.

* * * * *